United States Patent [19]

Ishida et al.

[11] Patent Number: 4,544,144
[45] Date of Patent: Oct. 1, 1985

[54] HYDROPNEUMATIC SPRING

[75] Inventors: Kunio Ishida; Shinji Kaneko, both of Yokohama, Japan

[73] Assignee: Tokico Kabushiki Kaisha, Kawasaki, Japan

[21] Appl. No.: 223,169

[22] Filed: Jan. 7, 1981

[30] Foreign Application Priority Data

Jan. 14, 1980 [JP] Japan ................... 55/2797

[51] Int. Cl.$^4$ .......................... F16F 5/00; F16F 9/06
[52] U.S. Cl. .................... 267/64.15; 188/315; 188/317; 188/322.17; 267/120
[58] Field of Search .......... 188/313, 315, 317, 322.17, 188/322.21, 284, 314; 267/64.11, 64.15, 120, 124, 127, 64.28

[56] References Cited

U.S. PATENT DOCUMENTS

| | | | |
|---|---|---|---|
| 2,248,865 | 7/1941 | Griepenstroh | 267/64.15 |
| 2,564,790 | 8/1951 | Orloff et al. | 267/64.15 |
| 2,649,938 | 8/1953 | Crabtree | 188/317 |
| 2,939,696 | 6/1960 | Tuczek | 267/64.15 |
| 3,147,966 | 9/1964 | Axthammer et al. | 267/64.15 |
| 3,316,558 | 5/1967 | Mortensen | 188/317 |
| 3,963,227 | 6/1976 | Mölders | 267/120 |
| 4,044,866 | 8/1977 | Ishida | 188/322.17 |
| 4,098,302 | 7/1978 | Freitag | 267/64.11 |
| 4,106,596 | 8/1978 | Hausmann | 188/314 |
| 4,114,866 | 9/1978 | Kato | 267/64.28 |
| 4,131,139 | 12/1978 | Tanabe | 188/317 |

FOREIGN PATENT DOCUMENTS

| | | |
|---|---|---|
| 1971284 | 10/1967 | Fed. Rep. of Germany . |
| 2902055 | 7/1979 | Fed. Rep. of Germany . |
| 1503393 | 3/1978 | United Kingdom . |
| 2006388 | 5/1979 | United Kingdom . |
| 1562420 | 3/1980 | United Kingdom . |

Primary Examiner—Douglas C. Butler
Attorney, Agent, or Firm—Quaintance & Murphy

[57] ABSTRACT

A gas spring in which the piston rod is connected to a piston with a through-hole bored therethrough which is disposed in the cylinder filled with high pressure gas and oil and the spring action is effected by axial movement of the piston rod, characterized in that, when the piston rod is fully pushed into the cylinder, the oil reservoir formed within the cylinder is closed, yielding an ample sealing effect; and when the piston rod is fully pulled out of the cylinder, the high pressure gas can be filled along the piston rod into the cylinder without being hindered by the oil in the cylinder.

4 Claims, 5 Drawing Figures

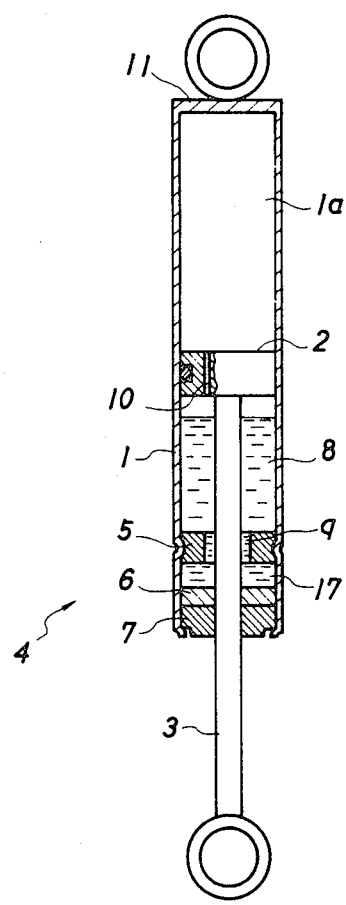
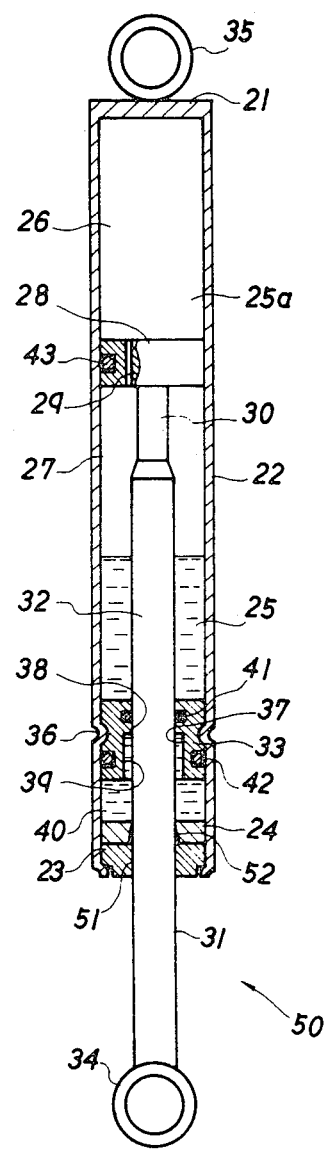
FIG. 1 PRIOR ART
FIG. 3

HYDROPNEUMATIC SPRING

BACKGROUND OF THE INVENTION (1) Field of the Invention

The present invention relates to a hydropneumatic spring in which a cylinder is filled with a high pressure gas, more specifically to a hydropneumatic spring which can develop a required spring force, regardless of changes in the posture of the hydropneumatic spring.

(2) Description of the Prior Art

The hydropneumatic spring functions as a spring by the constitution that a cylinder is filled with a high pressure gas; a slidable piston is disposed in the cylinder; the piston is connected to a piston rod; and the piston rod extends out of the cylinder.

In the prior hydropneumatic spring art a piston with a fluid passage is disposed in a cylinder with one end thereof closed and to the piston is integrally fixed a piston rod which can extend itself in the direction of the open end of the cylinder. The piston rod has a uniform diameter over its entire length. The open end of the cylinder is plugged with a rod guide and the piston rod is guided by the rod guide. At one side the rod guide adjoins a packing which is located within the cylinder. Midway in the cylinder a stopper is fitted and the midpart of the stopper has a passage of a constant diameter bored to pass the piston rod. The cylinder has oil filled therein, in order to optimize the spring action and at the same time to cooperate with the packing to make the sealing of the cylinder more complete.

If the prior art hydropneumatic cylinder described above is set with the piston rod held inside the cylinder during use or storage, all the oil moves to the closed side of the cylinder, i.e., the side opposite to the rod guide of the cylinder, via the passage through which the piston rod passes and the passage bored into the piston, whereby the sealing effect of the oil at the packing side vanishes. Consequently, the high pressure gas in the cylinder is able to leak out via the packing-cylinder clearance and the packing-piston rod clearance, and the spring action deteriorates.

Therefore, in applying the prior art hydropneumatic spring as mentioned above to the backdoor of an automobile (hereinafter referred to as "auto backdoor") for example, it is common practice to fit the hydropneumatic spring such that when the backdoor is shut, the closed end of the cylinder is higher than the rod, thereby preventing a deterioration of the spring action. Even when the hydropneumatic spring is positioned thus, at one stage in the process of opening the backdoor, passage of mainly the high pressure gas through the piston passage causes a weakening of the spring action and results in a jerky movement of the door. Further, after movement of all the oil to the closed side of the cylinder, only the high pressure gas flows through the piston passage and in consequence a heavy shock occurs at the instant the backdoor is fully-opened. Thus the motion of the backdoor is not always satisfactory.

Suppose the hydropneumatic spring is set with the piston rod end held above the closed end.

Even then, if the oil is filled into the space, perfectly sealed between the stopper and the packing for the purpose of avoiding the gas leak, it will become difficult at time of manufacture to introduce the high pressure gas into the cylinder through the clearance between the packing and the piston rod. And this will make it necessary to bore a passage elsewhere in the cylinder, fill the gas into the cylinder through this hole and after filling of the gas, plug the hole.

SUMMARY OF THE INVENTION (1) Objects of the Invention

The object of the present invention is to provide such a hydropneumatic spring that, even when laid for a long period with the piston rod positioned inside the cylinder, virtually no gas leaks out of the cylinder and thus the spring performance is maintained over a long period.

Another object of the present invention is to provide a hydropneumatic spring that can always develop the required spring force, despite changes in its posture during use.

Still another object of the present invention is to provide a hydropneumatic spring that possesses a wide latitude of positioning.

Still another object of the present invention is to provide a hydropneumatic spring that permits the high pressure gas to be filled into the cylinder without boring a special passage for this purpose.

BRIEF DESCRIPTION OF THE DRAWINGS

Other and further objects, features and advantages of the invention will appear more fully from the following description.

Some embodiments of the present invention will be explained in detail in conjunction with the accompanying drawings, in which:

FIG. 1 shows a section view of the prior art hydropneumatic spring.

FIG. 3 shows a section view of a preferable embodiment of the present invention.

DETAILED DESCRIPTION OF THE INVENTION

Figure 2:
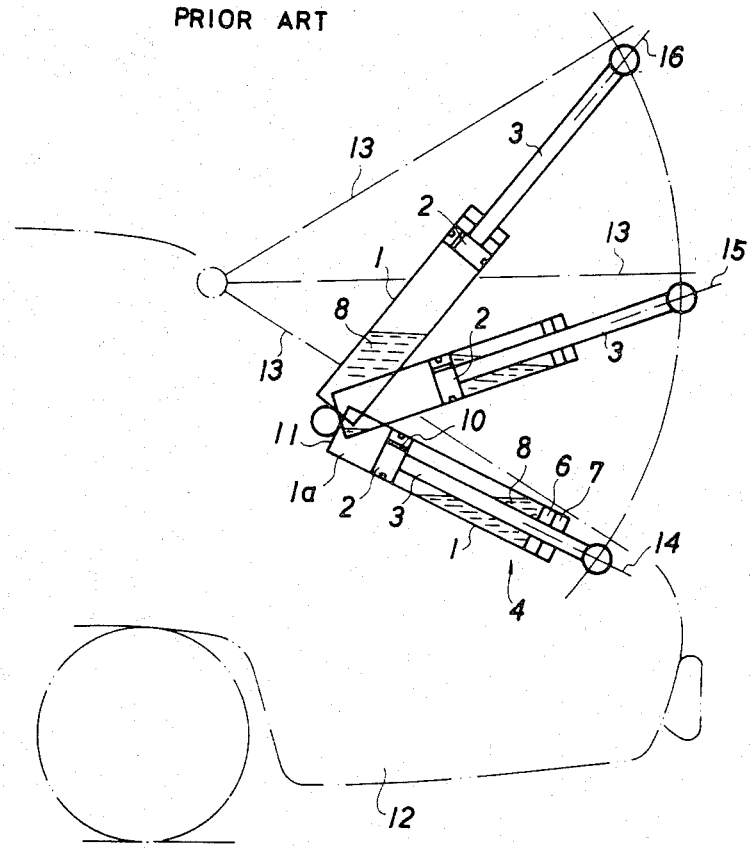
FIG. 2 illustrates application of the hydropneumatic spring in FIG. 1 to an auto backdoor.

In FIGS. 1 and 2 is shown one prior art hydropneumatic spring 4, in which a high pressure gas 1a is filled into the cylinder 1 and a piston rod 3 connected to a piston 2 is extended out of the cylinder 1, thereby performing a spring action. In this spring 4, a stopper 5 is provided within the cylinder 1, while a packing 6 is provided adjacent to a rod guide 7 so as to seal the cylinder 1. Meanwhile oil 8 is filled into the cylinder 1 so that an adequate spring action can be developed and the cylinder 1 can be more reliably sealed with cooperation of the packing 6.

In such a hydropneumatic spring 4, when it is in use or in storage, with the piston rod 3 held upward, all the oil 8 moves to the closed side 11 of the cylinder 1 via a passage 9 of the stopper 5 through which the piston rod 3 runs, and via a passage 10 in the piston 2, whereby the sealing effect of the oil 8 at the side of the packing 6 vanishes and consequently the high pressure gas in the cylinder 1 is able to leak out through the clearance between the packing 6 and the cylinder 1 and through the clearance between the packing 6 and the piston rod 3, thereby reducing the spring action.

For this reason, it is common practice, as illustrated in FIG. 2, in application for the backdoor 13 of an automobile 12, to fit the hydropneumatic spring such that the piston rod 3 moves down into cylinder 1 when the backdoor 13 is shut. However, when the hydropneumatic spring 4 is thus fitted, in the period from position 14 to position 15 in the process of the backdoor 13 being opened, mainly the high pressure gas 1a flows through the passage 10 and therefore the resistance is relatively low, permitting the door 13 to rise in a short time; in the period from position 15 to a little short of position 16, mainly the oil 8 flows through the passage 10 and therefore the resistance is relatively high, causing the door 13 to rise slowly; thereafter in the period from a little short of position 16 to position 16, all the oil 8 moves toward the closed side 11 of the cylinder and again only the high pressure gas 1a flows through the passage 10, causing the door 13 to rise quickly. Thus a heavy shock occurs when the door 13 is fully-opened and the motion of the door cannot be called good. Suppose, on the contrary, the space 17 between the stopper 5 and the packing 6 is perfectly sealed to prevent leakage of the high pressure gas 1a even when the piston rod end is held above the closed end 11, and then the oil is filled into the space 17. It then becomes difficult during manufacturing to introduce the high pressure gas into the cylinder 1 through the clearance between the packing 6 and the piston rod 3; and it will be necessary to bore a passage elsewhere, introduce the high pressure gas through this passage into the cylinder 1 and thereafter plug the passage.

Figure 4:
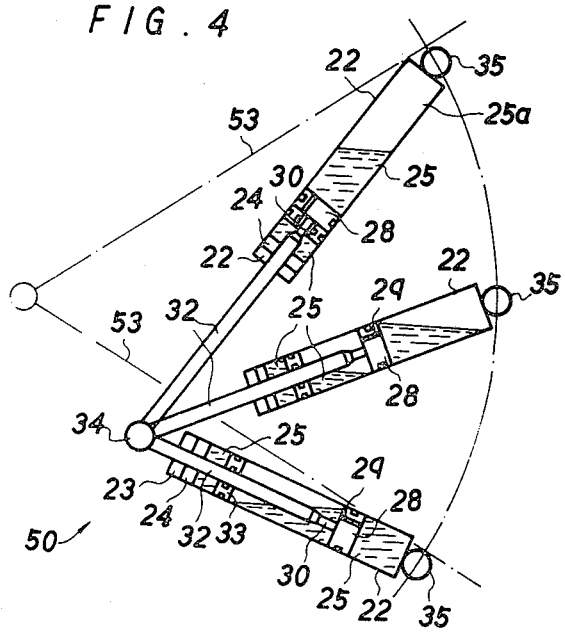
FIG. 4 illustrates application of the hydropneumatic spring in FIG. 3 for an auto backdoor.

One preferred embodiment of the present invention is shown in FIGS. 3 to 4.

In FIG. 3, a rod guide 23 is fitted to one end of a cylinder 22 with the other end thereof 21 closed. A packing 24 is provided adjacent to the rod guide 23 within the cylinder 22. The packing 24 serves to prevent high pressure gas 25a and oil 25 in the cylinder 22 from leaking out of the cylinder 12. A piston 28 which partitions the cylinder 22 into two spaces 26 and 27 has a passage 29 bored therein. The passage 29 may function as a damping orifice which maintain the flow of the fluid at reduced speed. Through the passage 29 the section 26 communicates with the section 27. The piston rod 32 consisting of a reduced diameter portion 30 as scooped portion and a large diameter portion 31 is connected at one end of the reduced diameter portion 30 to the piston 28. Meanwhile the piston rod 32 extends outward through a stopper 33, the packing 24 and the rod guide 23, and the piston contacts the stopper when the piston rod is at the point of fullest extension. An eye 34 for mounting is attached to the extending tip of the piston rod 32. A similar eye 35 for mounting is attached to the closed end 21 of the cylinder 22. The stopper 33 is immovably fixed at the annular projection 36 of the cylinder 22 and thus it serves to restrict the movement of a shift of the piston 28 toward the packing 24. A passage 37 of the stopper 33 through which the piston rod 32 runs is composed of a hole 38 with nearly the same diameter as the diameter of the large diameter portion 31 of the piston rod 32 and hole 39 of a diameter significantly larger than the diameter of the large diameter portion 31. In the hole 38 there is an O-ring 41 fitted to the stopper 33 so that an oil reservoir 40 between the stopper 33 and the packing 24 can be readily oil-tight when the large diameter portion 31 is located in the hole 38. Also an O-ring 42 is fitted on the outside of the stopper 33, thereby preventing the oil from leaking from the space 40 to the space 27 through the gap between the stopper 33 and the cylinder 22. The piston 28 has a piston ring 43 fitted thereto.

In such an arrangement of the hydropneumatic spring 50, when the piston rod 32 is fully pushed into the cylinder 22 and the large diameter portion 31 is in the passage 38, the space 27 will be sealed against the reservoir 40. When the piston rod 32 is fully pulled out of the cylinder 22, in other words, the piston 28 bears against the stopper 33 and the reduced diameter portion 30 comes into the passage 38, a gap will develop in the passage 38 between the stopper 33 and the reduced diameter portion 30, thereby communicating the reservoir 40 with the space 27. Thus, suppose the oil 25 is filled into the cylinder 22 and thereafter the spring is held vertically with the closed end 21 lower and the piston rod 32 fully pulled out of the cylinder 22. The oil 25, instead of staying in the reservoir 40, will then flow out into the space 26 through the gap between the reduced diameter portion 30 and the stopper 33 and through the passage 29, and it will collect in the space 26 at the closed side 21. In this way, using the similar method disclosed in U.S. Pat. No. 4,044,866, without being hindered by the oil, the high pressure gas may be introduced from outside into the cylinder 22 through the gap between the larger diameter portion 31 of the piston rod 32 and the rod guide 23 and through the gap 51 between the reduced diameter portion 30 of the piston rod 32 and the packing 24. Then the packing 24 and the rod guide 31 will move toward the open end of the cylinder so that the packing 24 in cooperation with the piston rod 31 can completely seal the cylinder 22. Thus it will not be necessary to bore a hole for high pressure gas filling elsewhere.

If, after filling of the high pressure gas 25a, the piston rod 32 is held vertically with the closed end 21 higher the piston rod 32 fully pulled out of the cylinder 22, the oil will flow from the space 26 into the reservoir 40 through the through-hole 29 and through the gap between the reduced diameter portion 30 and the stopper 33 and will collect in the reservoir 40. When, after filling of the oil 25 into the reservoir 40, the piston rod 32 is pushed into the cylinder 22 and the portion 31 comes into the passage 38 of the stopper 33, the reservoir 40 will be sealed against the space 27. In this state, even if the piston rod 32 as pushed into the cylinder 22 is held with the closed end 21 lower, the oil in the reservoir 40 will not leak into the space 27 and thus, with cooperation of the packing 24 and the O-ring 41, leakage of the high pressure gas 25a can be prevented.

The feature of this method is as follows.

The high pressure gas can be filled into the cylinder through a gas filling passage formed by a packing when the piston rod is at its maximum outward extending position. After gas filling, the packing is displaced by the pressure of the gas and the piston rod position is restricted by the stopper such that the packing plugs the gas filling passage. Thus, with no pressure rise corresponding to a penetration of the piston rod, the gas filling pressure can be reduced below the pressure in the prior art, thereby promoting the safety in gas filling work.

Figure 5:
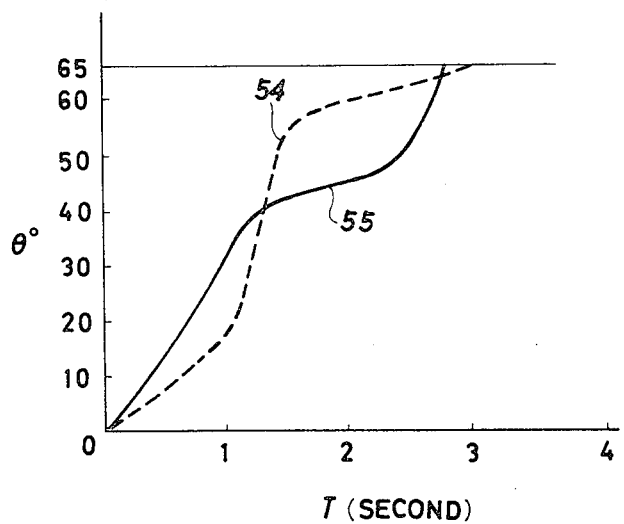
FIG. 5 shows a characteristic curve for time vs. backdoor openness degree.

A decreased gas pressure meanwhile implies a saving of gas consumption in the cylinder. Further, since the packing and the rod guide are not fixed but movable, the packing can be pressed into the cylinder by means of the rod guide even after gas filling. The pressure can thus be easily changed and gas replacement can be done as frequently as desired. The rod guide may be fitted to the cylinder by means of caulking. Furthermore, as illustrated in FIG. 4, the gas spring 50 can be employed for the backdoor 53 (in the case of lift back, hutch back car) in such a fashion that, when the door 53 is closed, the piston rod 32 extends into the cylinder 22; and, with the resistance of the oil 25 developed through the passage 29 a little before full-opening of the door 53, the door 53 can be fully-opened slowly without a shock. Namely, in FIG. 5, with time T (seconds) taken on the abscissa and the open degree θ° of the door 53 on the ordinate (full-open: 65°), the door 53 using the hydropneumatic spring 50 can be opened following the curve 54. The curve 55 shows the opening characteristic of the backdoor when the hydropneumatic spring 4 illustrated in FIG. 1 is applied in the state of FIG. 2. The volume of the oil supplied into the hydropneumatic spring is so determined that the oil may be present on both sides of the piston completely filling the piston passage 29 with oil as shown in the lowest location of FIG. 4. But, this is not restrictive depending on the applied condition and purpose.

In the above embodiment the reduced diameter portion is formed in the piston rod, bu this is not a restrictive feature in the present invention. For instance, the piston rod may be formed such that it has a uniform diameter and an axially extending groove is formed as a recess on the piston rod, so that a passage communicating the reservoir 40 with the space 27 can be formed when the groove comes into the possible 38. Further, although the reduced diameter portion is provided on the piston rod, just under the piston, this is not restrictive. The reduced diameter portion may be provided midway of the piston rod.

As described above, according to the present invention, an oil reservoir can be located on the packing side; therefore the hydropneumatic spring can be left for a long period with the piston rod held inside the cylinder 22, thereby enlarging the latitude of fitting conditions.

Moreover, since the oil in the oil reservoir can be temporarily drained, the prior art method of gas filling can be adopted and there is no need to provide a special hole for gas filling.

Further, when applied for an auto backdoor, the hydropneumatic spring according to the present invention can mitigate the shock in full-opening of the door, thereby improving the movability of the door.

What is claimed is:

1. A hydropneumatic spring comprising:
(A) a cylinder having an open end and a closed end; and
(B) a rod guide fitted to the open end of the cylinder and having a passage therein; and
(C) a packing means provided adjacent to said rod guide and within the cylinder in sealing engagement with the inner circumference of the cylinder and having a passage therein which is in alignment with the passage in the rod guide; and
(D) a stopper means provided within the cylinder in sealing engagement with the inner circumference of the cylinder and having a passage therein, aid stopper means dividing the interior of the cylinder into an oil reservoir defined by the stopper and the packing and a working space defined by the stopper and the closed end of the cylinder; and
(E) a slidable piston within the working space adapted to contact the inner walls of the cylinder and having passage therein for communicating both sides of the working space partitioned by the piston; and
(F) a piston rod connected to the piston and extending outside the cylinder via the passages in the stopper, in the packing means and in the rod guide, said piston rod being in sealing engagement with the inner circumferences of the passages in the stopper and in the packing, said piston rod having such a recess thereon adjacent to the piston that it may form a passage between the inner circumference of the passage in the stopper and the outer circumference of the piston rod so as to communicate the oil reservoir and the working space when the extension of the piston rod beyond the other end of the cylinder is more than a specified amount during movement of the piston and piston rod within the cylinder
wherein the recess is a reduced diameter portion of the piston rod wherein the passage in the stopper is provided at the inner circumference thereof with a portion wider than the outer diameter of the piston rod
wherein the wider portion of the passage in the stopper is in fluid communication with the oil reservoir.

2. A hydropneumatic spring comprising:
(A) a cylinder having an open end and a closed end; and
(B) a rod guide fitted to the open end of the cylinder and having a passage therein; and
(C) a packing means provided adjacent to said rod guide and within the cylinder in sealing engagement with the inner circumference of the cylinder and having a passage therein which is in alignment with the passage in the rod guide; and
(D) a stopper means provided within the cylinder in sealing engagement with the inner circumference of the cylinder and having a passage therein, said stopper means dividing the interior of the cylinder into an oil reservoir defined by the stopper and the packing and a working space defined by the stopper and the closed end of the cylinder; and
(E) a slidable piston within the working space adapted to contact the inner walls of the cylinder and having a passage therein for communicating both sides of the working space partitioned by the piston; and
(F) a piston rod connected to the piston and extending outside the cylinder via the passages in the stopper, in the packing means and in the rod guide, said piston rod being in sealing engagement with the inner circumferences of the passages in the stopper and in the packing, said piston rod having such a recess thereon adjacent to the piston that it may form a passage between the inner circumference of the passage in the stopper and the outer circumference of the piston rod so as to communicate the oil reservoir and the working space when the extension of the piston rod beyond the other end of the cylinder is more than a specified amount during movement of the piston and piston rod within the cylinder
wherein the recess is a groove formed on the piston rod in an axial direction thereof;
wherein the passage in the stopper is provided at the inner circumference thereof with a portion wider than the outer diameter of the piston rod;

wherein the wider portion of the passage in the stopper is in fluid communication with the oil reservoir.

3. A hydropneumatic spring comprising:
(A) a cylinder having an open end and a closed end; and
(B) a rod guide slidably mounted in the cylinder adjacent to the open end thereof, said rod guide having a passage therein; and
(C) a packing means provided adjacent to said rod guide and within the cylinder is sealing engagement with the inner circumference of the cylinder and having a passage therein which is in alignment with the passage in the rod guide; and
(D) a stopper means provided within the cylinder in sealing engagement with the inner circumference of the cylinder and having a passage therein a portion of which is significantly wider than the outer diameter of the piston rod; which portion is in fluid communication with the oil reservoir; said stopper means dividing the interior of the cylinder into an oil reservoir defined by the stopper and the packing and a working space defined by the stopper and the closed end of the cylinder; and
(E) a slidable piston within the working space adapted to contact the inner walls of the cylinder and having a passage therein for communicating both sides of the working space partitioned by the piston; and
(F) a piston rod connected to the piston and extending outside the cylinder via the passages in the stopper, packing means and in the rod guide, said piston rod being in sealing engagement with the inner circumferences of the passages in the stopper and in the packing, said piston rod having such a reduced diameter portion thereof adjacent to the piston that it may form a passage between the inner circumference of the passage in the stopper and the outer circumference of the piston rod so as to communicate the oil reservoir and the working space when the extension of the piston rod beyond the other end of the cylinder is more than a specified amount during movement of the piston and piston rod within the cylinder;
(G) an eye for mounting, attached to the end of the piston rod opposite the piston; and
(H) an eye for mounting, attached to the closed end of the cylinder; and
(I) an O-ring fitted to the inside of the stopper having an inner circumference equal to the outer circumference of that portion of the piston rod furthest removed from the piston; and
(J) an O-ring fitted to the outside of the stopper and providing sealing engagement between the stopper and the inside walls of the cylinder; and
(K) a piston ring fitted to the piston;
wherein the passage in the piston functions as a damping orifice; and wherein the gap between the large diameter portion of the piston rod and the rod guide and the gap between the reduced diameter of the piston rod and the packing forms a high-pressure gas passage thereby eliminating the necessity of boring elsewhere a passage for high-pressure gas filling; and
wherein the piston contacts the stopper when the piston rod is at the point of fullest extension.

4. In an automobile having a body and a hatch stably attached by hinges to the body said hatch extending downwardly from the hinges when closed and extending upwardly from the hinges when open; the improvement comprising a hydropneumatic spring comprising:
(A) a cylinder having an open end and a closed end and having cylindrical inside walls adapted to receive a piston; the closed end of said cylinder attached to the hatch at a point remote from the hinges; and
(B) a piston having two parallel juxtaposed faces, one face facing the closed end of the cylinder, the other face facing the open end of the cylinder, wherein the closed end of the cylinder and the face of the piston facing the closed end of the cylinder define a first space; a fluid passage in the piston intersecting both faces of the piston; and
(C) a rod guide slidably mounted in the open end of the cylinder; said rod guide having a cylindrical passage therein; and
(D) packing in contact with the rod guide; and
(E) a stopper fixedly attached to the inside walls of the cylinder, said stopper having a central passage therein, said central passage having a narrower diameter and a larger diameter; and
(F) a piston rod fixedly attached at its first end to the piston; said piston rod having a reduced diameter portion immediately adjacent to the piston, said reduced diameter portion extending axially along the piston rod from the piston to a point on the piston rod that is displaced from the piston a distance greater than the distance from the upper surface of the stopper and the lower surface of the stopper; said piston rod attached to said body at a point on said body lower than the hinges but higher than the point of attachment of the cylinder to the hatch; and
(G) a second space defined by the surface of the piston facing the open end of the cylinder and by the cylinder walls and by the adjacent surface of the stopper; and
(H) a reservoir defined by the packing, the inner walls of the cylinder, and the surface of the stopper opposite the packing; and
(I) a liquid present in the reservoir, in the second space and/or the first space;
whereby when the hatch in closed, liquid is in contact with the closed end of the cylinder; and when the hatch is opened, liquid flows through the fluid passage in the piston.

* * * * *

UNITED STATES PATENT OFFICE
CERTIFICATE OF CORRECTION

Patent No. 4,544,144              Dated October 1, 1985

Inventor(s) Kunio Ishida and Shinji Kaneko

It is certified that error appears in the above-identified patent and that said Letters Patent are hereby corrected as shown below:

Col. 8, Line 10, delete "stably" and insert --rotatably--.

Signed and Sealed this

Eleventh Day of February 1986

[SEAL]

Attest:

DONALD J. QUIGG

Attesting Officer        Commissioner of Patents and Trademarks